(12) United States Patent
Morita et al.

(10) Patent No.: US 7,763,380 B2
(45) Date of Patent: Jul. 27, 2010

(54) PACKAGING CONTAINER FOR TRANSPORTING BATTERIES

(75) Inventors: Yoshinobu Morita, Hirakata (JP); Yutaka Hongo, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1253 days.

(21) Appl. No.: 10/129,373

(22) PCT Filed: Sep. 5, 2001

(86) PCT No.: PCT/JP01/07714

§ 371 (c)(1),
(2), (4) Date: May 6, 2002

(87) PCT Pub. No.: WO02/21614

PCT Pub. Date: Mar. 14, 2002

(65) Prior Publication Data

US 2003/0034274 A1 Feb. 20, 2003

(30) Foreign Application Priority Data

Sep. 5, 2000 (JP) .............................. 2000-269119

(51) Int. Cl.
*H01M 2/00* (2006.01)

(52) U.S. Cl. ........................ 429/176; 429/149; 429/163

(58) Field of Classification Search ................. 429/147, 429/176
See application file for complete search history.

(56) References Cited

U.S. PATENT DOCUMENTS

| 1,837,012 | A |  | 12/1931 | Boeye |
|---|---|---|---|---|
| 5,494,152 | A |  | 2/1996 | Sobczak et al. |
| 5,871,100 | A | * | 2/1999 | Ward .......................... 206/705 |
| 6,343,696 | B1 | * | 2/2002 | McCormick et al. ........ 206/594 |
| 6,547,075 | B1 | * | 4/2003 | Usui .......................... 206/455 |

FOREIGN PATENT DOCUMENTS

| JP | 58-88319 | 6/1983 |
|---|---|---|
| JP | 59-28961 | 2/1984 |
| JP | 5-028979 | 2/1993 |

\* cited by examiner

*Primary Examiner*—Patrick Ryan
*Assistant Examiner*—Cynthia Lee
(74) *Attorney, Agent, or Firm*—Jordan and Hamburg LLP (57) ABSTRACT

A package container for shipping and transporting small batteries, such as lithium ion rechargeable batteries, from manufacturers which meets the conditions of Container Grade II applicable to lithium batteries including a large amount of metal lithium and satisfies the requirements of ICAO/IATA Code A45. By employing a material having a bursting strength of 13.0 kgf/cm$^2$ or more, according to a bursting strength test method regulated in JIS, in order to form an exterior container having a gross weight is 25 kg or lower and arranging the small batteries in package packs in the exterior container, the small batteries are transported safely.

12 Claims, 6 Drawing Sheets

Fig. 8

PACKAGING CONTAINER FOR TRANSPORTING BATTERIES

TECHNICAL FIELD

The present invention relates to a package container for shipping and transporting small batteries such as lithium primary batteries and lithium ion rechargeable batteries from manufacturers.

BACKGROUND ART

As progress has been made in the reduction of size and weight, or functionality of portable electronic devices such as a portable telephone, a notebook computer, and portable audio-visual equipment, a smaller size and a higher power have been required for batteries which serve as their power sources, and lithium primary batteries and lithium ion rechargeable batteries have come into increasing use as batteries capable of meeting the requirement. Moreover, the power source of cameras is progressively altered from alkaline batteries, which have been used for the power source, to lithium primary batteries with progress in the electronic control of the cameras.

These lithium primary batteries and lithium ion rechargeable batteries have a higher energy density and a higher output voltage than widely used conventional nickel-cadmium rechargeable batteries and the alkaline batteries, allowing number of batteries used to be decreased, and thus they are suitable for the power source of the portable electronic devices and cameras as described above. However, since organic electrolyte is utilized in these lithium-based batteries, if the batteries catch fire they are burned violently. Such batteries having high energy density and including flammable organic electrolyte are regulated depending on transport means when they are shipped from the manufacturers of the batteries.

For example, there are regulatory actions in international air transport according to TI (Technical Instruction) of ICAO (International Civil Aviation Organization) and DGR (Dangerous Goods Regulation) of IATA (International Air Transport Association), and the regulatory actions in domestic air transport according to Aviation Law. Also, in ship transport, there are regulatory actions in international ship transport according to IMDGC (International Maritime Dangerous Goods Code) of IMO (International Maritime Organization) and SOLAS (Safety of Life at Sea) agreement, and the regulatory actions in domestic ship transport according to Law for Safety of Vessels and Dangerous Goods Regulation.

Committee of Experts of Dangerous Goods established in Economic and Social Council of United Nations designates lithium batteries, gunpowder, gasoline, and radioactive materials as the dangerous goods, and set strict terms for the international transport of them. United Nations Committee of Experts on the Transport of Dangerous Goods Recommendation (UN recommendation) designates the comparatively large lithium batteries, in which metal lithium is 5 g or more in a cell or 25 g or more in a battery pack, as the dangerous goods of Class 9, and required a package container of the Dangerous Goods Container Grade II for transport of the batteries. In addition, the dangerous goods involving the Container Grade II is obliged to be examined for packing, and prohibited from being transported unless it passes on the examination.

On the other hand, according to the Special Clause SP188 of UN Recommendation issued in 1998, lithium primary batteries using metal lithium, in case metal lithium or lithium alloy is 1 g or lower in a cell or 2 g or lower in a battery pack, they are excluded from the designation of the dangerous goods because lithium content is low and potential danger is minor.

In UN Committee of Experts on the Transport of Dangerous goods in December of 1998, lithium ion rechargeable batteries also became a control subject. However, the lithium ion rechargeable batteries don't include metal lithium and are regarded to be less dangerous than the lithium primary battery, so the batteries in which the lithium content in terms of metal lithium is 1.5 g or lower in a cell or 8 g or lower in a battery pack are excluded from the designation of the dangerous goods.

Today, for the lithium primary batteries and the lithium ion rechargeable batteries excluded from the designation of the dangerous goods in the UN Recommendation, there is no agreement on the transport conditions such as the designation of the internationally unified package container, and the battery manufacturers and transport agents appropriately pack the batteries in their original style and transport them.

However, even if excluded from the scope of the UN Recommendation, in cases where the lithium primary batteries and the lithium ion rechargeable batteries are transported by air, "Package Regulated on Actions for Preventing Short Circuit of Batteries and Pack into Robust Exterior Containers" in ICAO/IATA Code A45 must be conformed.

This "Package Regulated on Actions for Preventing Short Circuit of Batteries and Pack into Robust Exterior Containers" is much abstract expression, and thus decision is left to the battery manufacturers and the transport agents. However, hereafter, manufacturers and transport agents, who have short experience in production and shipment, will probably entry in the production and transport of the lithium primary batteries and the lithium ion rechargeable batteries. Consequently, a certain framework concerning performance of the package container for transport is desired to be made. Regarding the transport of batteries using flammable organic electrolyte such as the lithium primary batteries and the lithium ion rechargeable batteries, safe transport must be secured still more for a solid development of the industrial world including battery manufacturers, makers of equipment using batteries, and service companies.

An object of the present invention is to provide a package container for transporting the lithium primary batteries and the lithium ion rechargeable batteries which are small and excluded from the scope, and not regulated clearly by Codes as described above, the container which passes on the examination of the Container Grade II applicable to the dangerous goods of Class 9 in the UN Recommendation described above, and satisfies the requirements of ICAO/IATA Code A45.

DISCLOSURE OF THE INVENTION

To achieve the above object, according to a first aspect of the present invention, there is provided a package container for transporting small batteries having a lithium content equal to or less than a regulated value diagnosed as dangerous goods, characterized in that a bursting strength of material forming an exterior container, having a gross weight of 25 kg or lower when it packs a plurality of small batteries, is 13.0 kgf/cm$^2$ or more in a test method regulated in JIS. If the gross weight is 25 kg or lower when the plurality of small batteries are contained and packed in the exterior container, manual handling is possible, and if the exterior container is made of cardboard or fiberboard having the bursting strength of the above value or more, the small batteries are transported safely.

According to a second aspect of the invention, there is provided a package container for transporting small batteries having a lithium content equal to or less than a regulated value diagnosed as dangerous goods, characterized in that the exterior container, having a gross weight of 25 kg or lower when it packs the plurality of small batteries, is formed to be a hexahedron of which each corner of each face lies at right angle, the small batteries never eject from the package container even when the exterior container drops on the corner of its top panel from a height of 1.2 m, and the exterior container has such a strength that a deformation, that affects on the safety of the transport, never occurs even if the containers are stacked up to a height of 3 m. By packing the plurality of small batteries using the exterior container passing on the drop test and the stacking test, the safe transport of the small batteries is secured.

In each of the above constructions, the material forming the exterior container is preferably a double or a triple wall corrugated cardboard with a combination of A flute and B flute, or a combination of C flute and B flute, these flutes having pulp liners and a thickness of 7 mm or more.

When a surface liner of the double wall corrugated cardboard, having a basis weight of 210 g/m$^2$ and more and a bursting strength of 6 kgf/cm$^2$ and more, regulated in JIS, is utilized, a desired strength is obtained. The exterior container is reinforced and the small batteries are protected more effectively by placing at least one layer of double wall or double faced corrugated cardboard inside the exterior container.

Further, although the package container of the invention can be applied to a nickel hydride battery and an alkaline battery, the invention mainly intends to transport the lithium primary batteries and the lithium ion rechargeable batteries, and devices incorporating the lithium primary batteries and the lithium ion rechargeable batteries or equipment packed together with the batteries, satisfying the requirements of the controls.

When transporting a cell, by partitioning every cell with an insulating material, a short circuit due to vibration and shock during the transport is prevented. When transporting a battery module or a battery pack, by forming it in individual package packed by each of the plural blocks, short circuit is prevented and the batteries are protected more securely.

The package container of the invention is intended to safely transport a lithium primary battery in which the metal lithium or lithium alloy content is 1 g or lower in a cell and 2 g or lower in a battery pack, or a lithium ion rechargeable battery in which the converted metal lithium content is 1.5 g or lower in a cell and 8 g or lower in a battery pack, the batteries being excluded from the designation of the dangerous goods according to the UN Recommendation, and the construction of this invention is indicated as a due standard of the package container.

BEST MODE FOR CARRYING OUT THE INVENTION

Hereinafter, embodiments of the present invention will be described with reference to the accompanying drawings so that the invention will be clearly understood. The following embodiments are given as only an example implementing the invention, and do not limit the technical scope of the invention.

These embodiments show a package container for packing and transporting small batteries, particularly the lithium primary batteries and the lithium rechargeable batteries excluded from the designation of the dangerous goods in the Special Clause SP 188 of the UN Recommendation.

Figure 1:
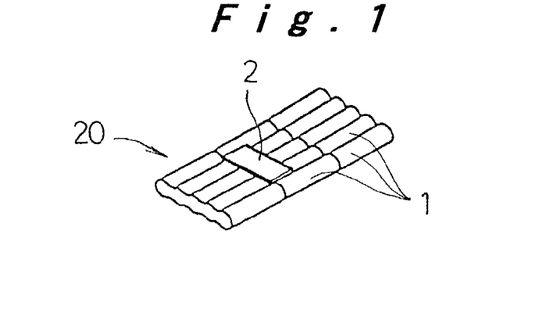
FIG. 1 is a perspective view showing a construction of a battery pack according to an embodiment.
Figure 2A:
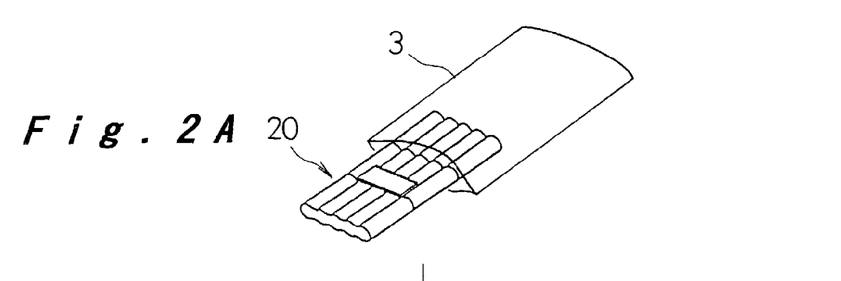
FIGS. 2A, 2B, 2C and 2D are perspective views showing an assembling procedure of an individual package pack.
Figure 2B:
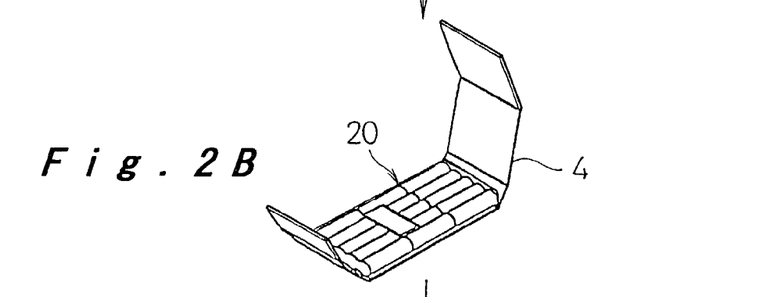
Figure 2C:
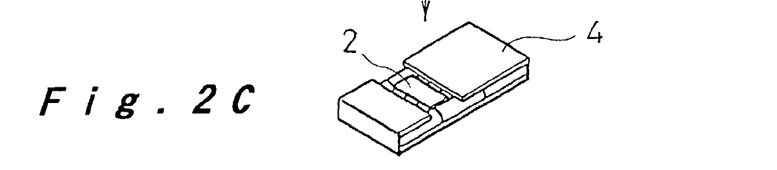
Figure 2D:
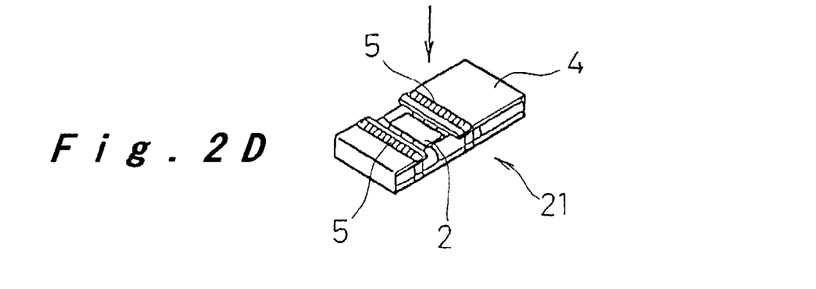

A small battery 1 to be packed with a package container of the embodiment is a lithium ion rechargeable battery of IEC Code: ICR18650. As shown in FIG. 1, 15 pieces of the batteries 1 are placed in parallel in a set of 5 pieces to be bundles, the bundles are placed in series in a set of 3 bundles, an SU (Safety Unit) substrate 2 is coupled, and thus the batteries 1 are constructed as a battery pack 20. The battery pack 20 is packaged individually according to a procedure shown in FIGS. 2A to 2D. First, the battery pack 20 is inserted into a polyethylene envelope 3 having a thickness of 0.03 mm as shown in FIG. 2A, then wrapped with an individual package pad 4 made of a B flute double faced corrugated cardboard. As shown in FIG. 2B and FIG. 2C, the top panel of the SU substrate 2 is not covered so as not to compress the SU substrate 2, the individual package pad 4 is folded back to its inside, and the folded area is fixed with a cellophane tape 5 as shown in FIG. 2D, thereby forming an individual package pack 21. The individual package packs 21 are stacked up on five layers, and formed in an individual package block 22 bundled integrally with a vinyl tape 6 as shown in FIG. 4.

Hereinafter, Examples 1 to 4 for packing the individual package blocks 22 will be shown, and verified results on suitability obtained from a comparison between the examples having different packing conditions and packing weights from one another, and two comparative examples will be described.

EXAMPLE 1

Figure 3:
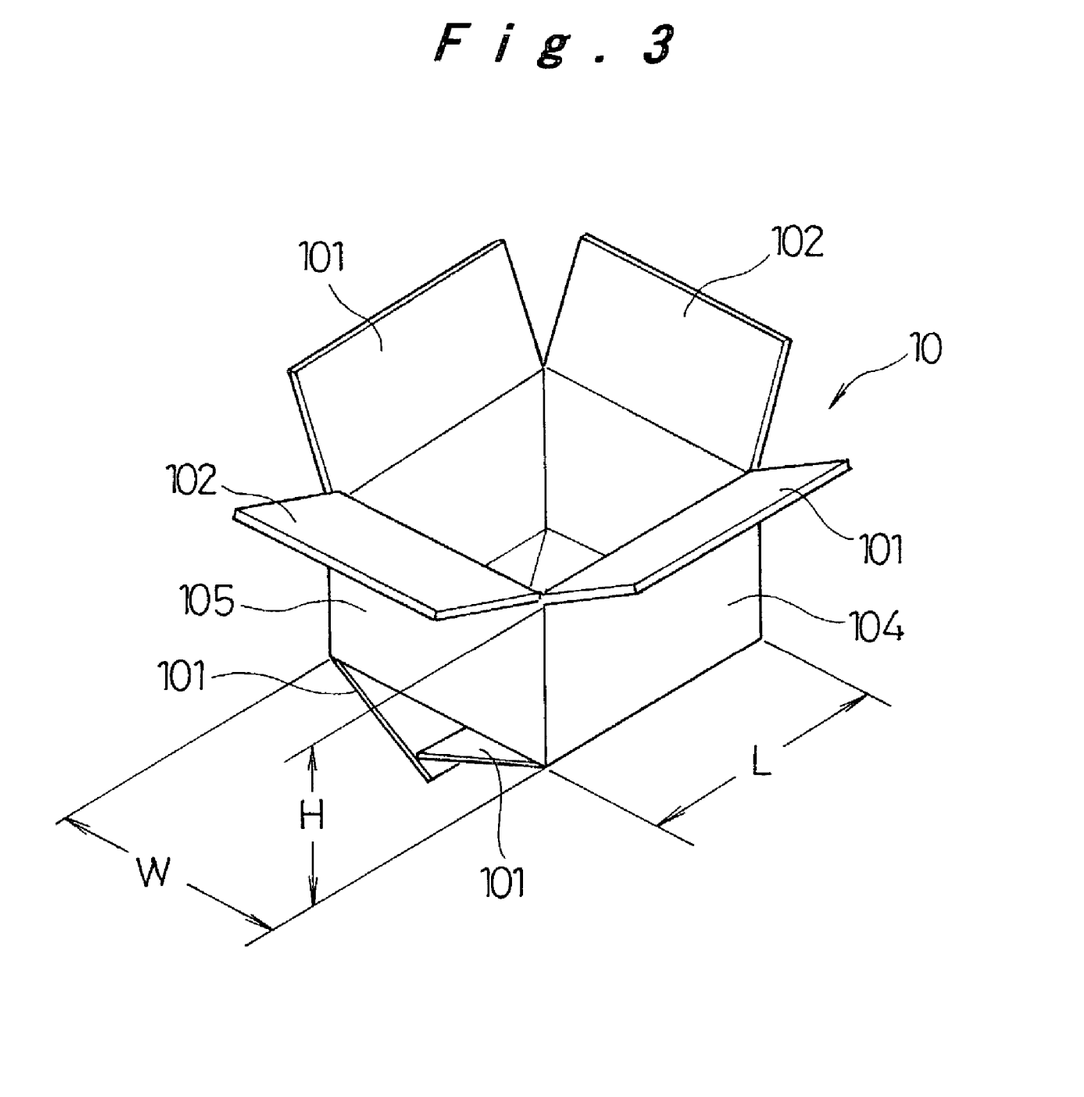
FIG. 3 is a perspective view showing an exterior container according to Example 1.
Figure 4:
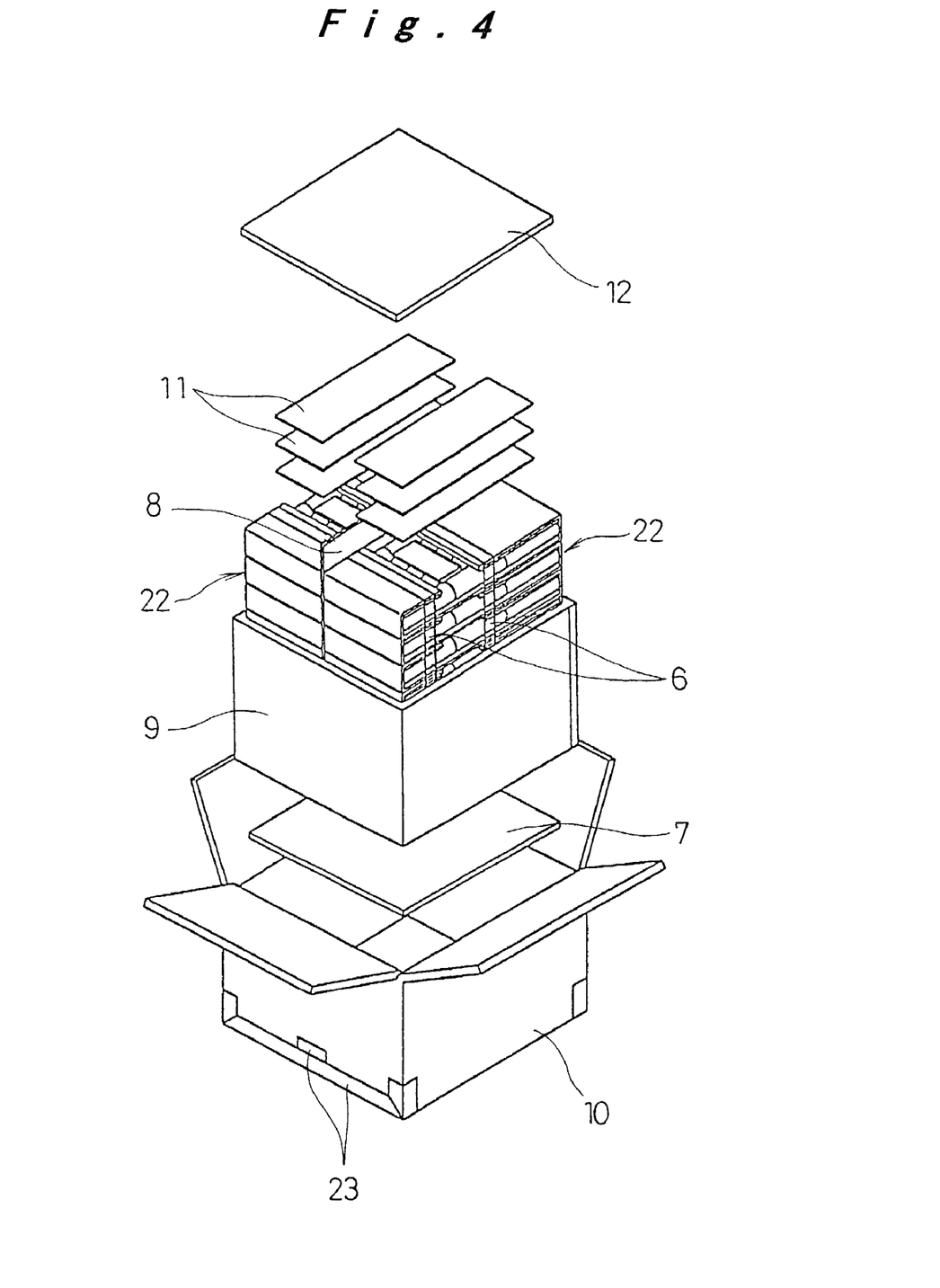
FIG. 4 is a perspective view showing a construction of the package container according to Example 1.

In Example 1, two individual package blocks 22 are contained to be packed in an exterior container 10 as shown in FIG. 4. The exterior container 10 is formed in 230 mm in length L, 230 mm in width W, and 198 mm in height H of its dimension using the double wall corrugated cardboard with a combination of the A flute and the B flute as shown in FIG. 3. The used double wall corrugated cardboard has uniform quality, no defects such as bonding defects between a corrugating medium and the liner, stain, and chips, and the thickness of 8 mm. The surface liner is a pulp liner, belongs to A Class regulated in JIS P3902, and has a basis weight of 218 g/m$^2$ and a bursting strength of 6.6 kgf/cm$^2$. A lap bonding using a steel flat wire 1.7 mm wide with anti-corrosive treatment is utilized in bonding of the cardboard. Respective surfaces of the slice and folding portions of longitudinal faces 104, lateral faces 105, inside flaps 102, and outside flaps 101 forming the exterior container 10 are perpendicular to each other, and when they are folded from folding edges to be formed in a box, there should be no breakage in their surfaces and no defect in the cut edges.

In the pack of the individual package blocks 22 with the exterior container 10, accessories are arranged as shown in FIG. 4 so that the exterior container 10 protects the individual package block 22 more securely.

First, a bottom of the exterior container 10 is closed. Bonding area of the bottom is a lap bonding area using a flat wire, width of a joint flap is 38 mm, space between flat wire stops is 50 mm, and distance from the folding line of the inside flap 102 to the nearest flat wire is 22 mm. Gummed fabric tape 23 having a width of 55 mm is adhered to the lap bonding area together with edges of the outside flaps 101, parallel to the lateral faces 105.

Figure 5:
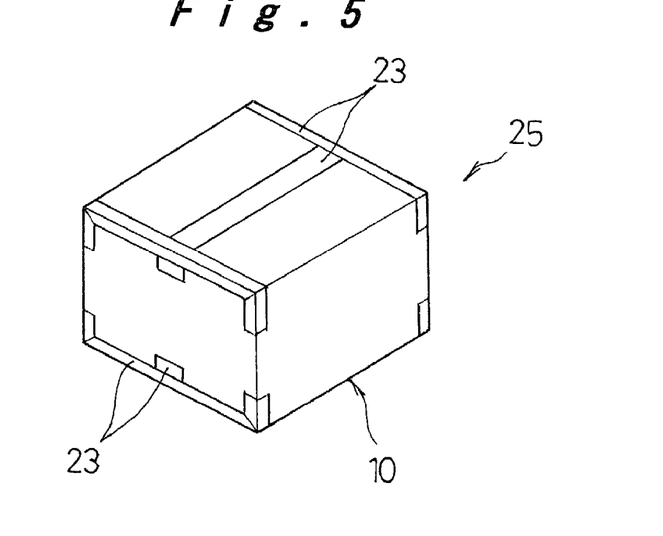
FIG. 5 is a perspective view showing a packing condition of the package container according to Example 1.

A lower pad 7 made of the A flute double faced corrugated cardboard with a thickness of about 5 mm is put into an inside bottom of the exterior container 10 having a closed bottom. Next, two individual package blocks 22 are placed in parallel via a divider 8 made of the A flute cardboard, their circumference is enclosed by a sleeve 9 made of the double wall corrugated cardboard with the A flute and the B flute, and then they are put into the exterior container 10. Next, three sheets of filling plates 11 for filling space between the exterior container 10 and the individual packs 22 are stacked on each of the individual packs 21, an upper pad 12 made of the A flute cardboard is placed thereon, the inside flaps 102 and the outside flaps 101 of the exterior container 10 are closed, and they are fixed by adhering the gummed fabric tape 23 having a width of 55 mm. According to the above packing procedure, a battery pack article 25 is completed as shown in FIG. 5. The gross weight of the pack in Example 1 is 6.8 kg in which the weight of the battery pack 20 is 5.8 kg.

EXAMPLE 2

Figure 6:
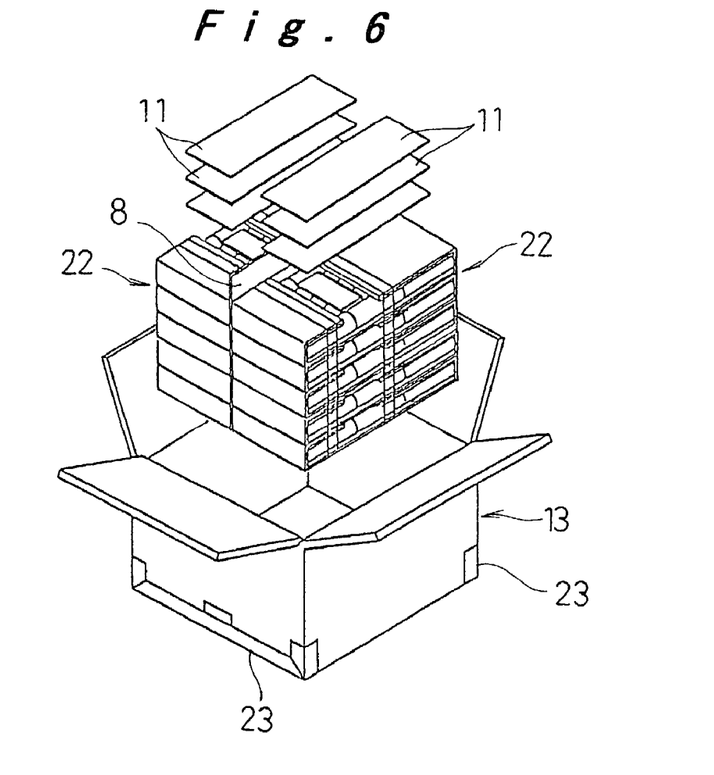
FIG. 6 is a perspective view showing a construction of a package container according to Example 2.

In Example 2, similarly as Example 1, two individual package blocks 22 are contained to be packed in an exterior container 13. As shown in FIG. 6, the divider 8 is placed between the two individual package blocks 22, the blocks are put in the exterior container 13 having the closed bottom, five sheets of filling plates 11 are placed on each of the individual package blocks 22, and the top panel of the exterior container 13 is closed. A different point from Example 1 is that the lower pad 7, the upper pad 12, and the sleeve 9 are not provided.

Although the material used and the forming method of the exterior container 13 is equal to those of the exterior container 10 in Example 1, its dimension is formed slightly smaller than the exterior container 10 because number of accessories such as the lower pad 7 is reduced. The gross weight of the pack in Example 2 is 6.5 kg in which the weight of the battery pack 20 is 5.8 kg.

EXAMPLE 3

Figure 7:
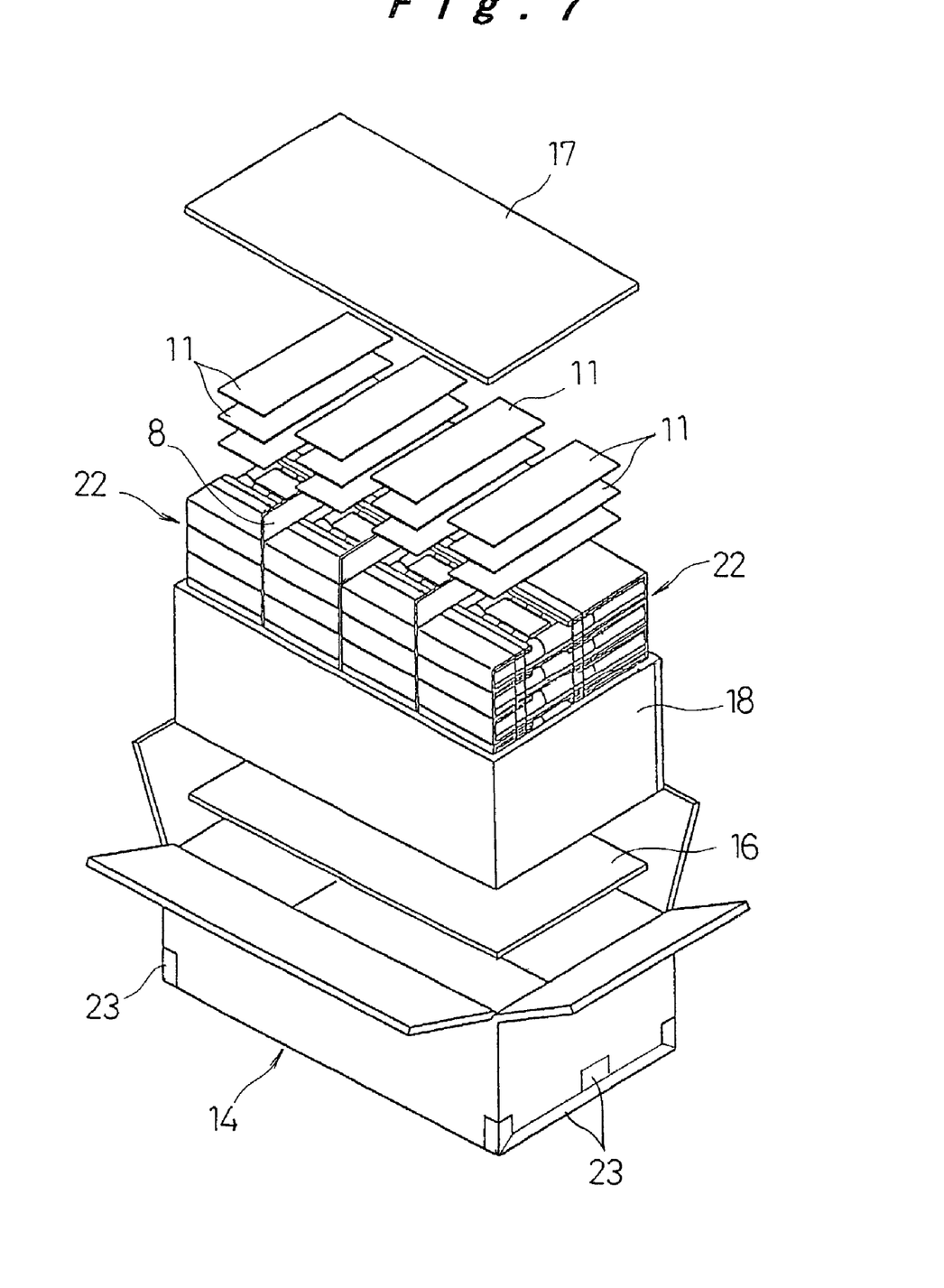
FIG. 7 is a perspective view showing a construction of a package container according to Example 3.

In Example 3, as shown in FIG. 7, four individual package blocks 22 are contained to be packed in an exterior container 14 formed with the same materials and forming method as those of the exterior container 10 in Example 1. The bottom of the exterior container 14 is closed, and a lower pad 16, made of the A flute double faced corrugated cardboard, is put into the inside bottom of the exterior container 14. The four individual package blocks 22 are placed on the lower pad 16 via the divider 8 made of the A flute double faced corrugated cardboard, their circumference are enclosed by a sleeve 18 made of the double wall corrugated cardboard using the A flute and the B flute, three sheets of filling plates 11 are placed on each of the individual package blocks 22, an upper pad 17 made of the A flute double faced corrugated cardboard is placed thereon, and then the top panel of the exterior container 14 is closed. The gross weight of the pack in Example 3 is 13.1 kg in which the weight of the battery pack 20 is 11.6 kg.

EXAMPLE 4

Figure 8:
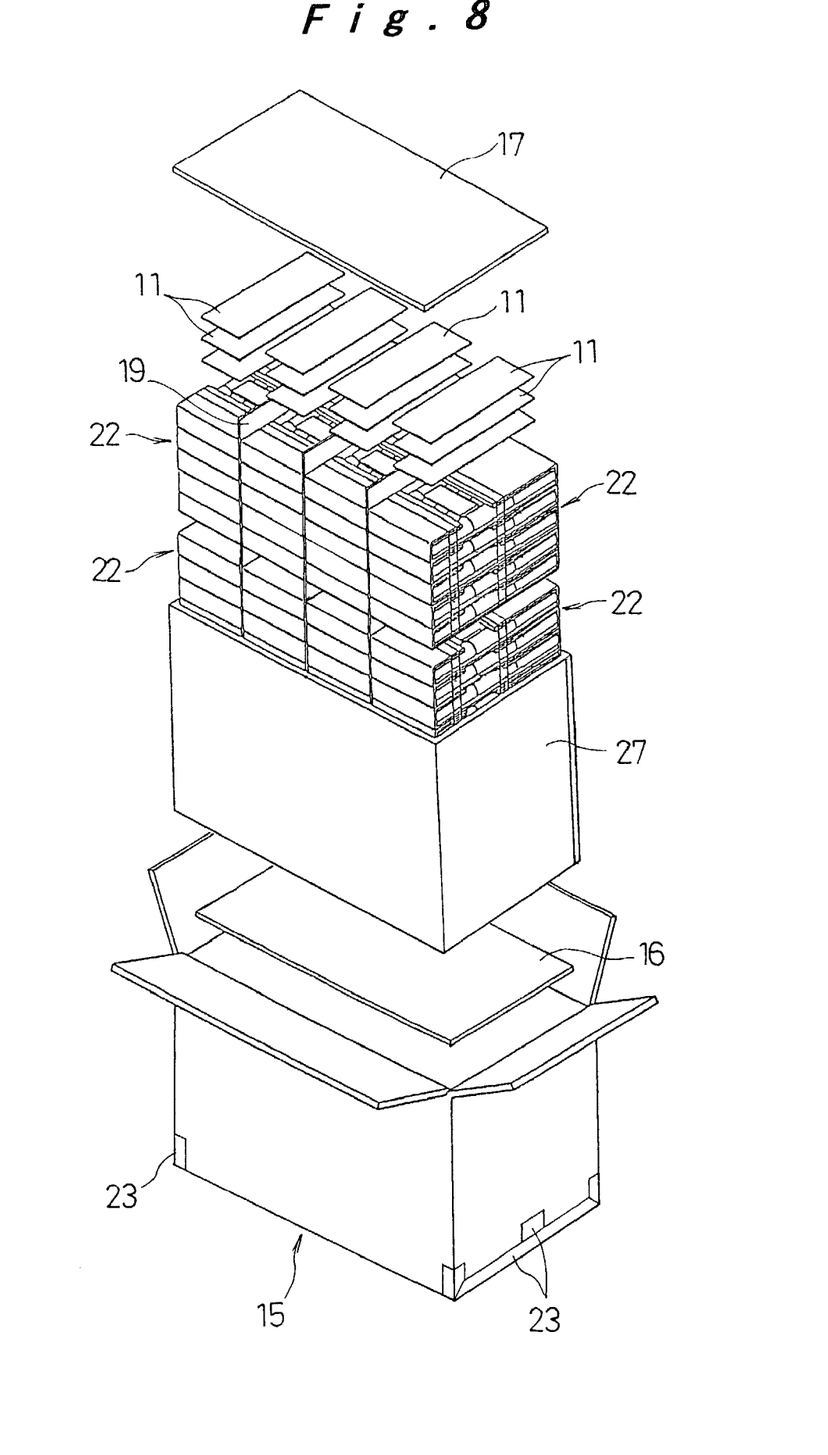
FIG. 8 is a perspective view showing a construction of a package container according to Example 4.

In Example 4, as shown in FIG. 8, eight individual package blocks 22 are contained to be packed in an exterior container 15 formed with the same materials and forming method as those of the exterior container 10 in Example 1. The bottom of the exterior container 15 is closed, and the lower pad 16, made of the A flute double faced corrugated cardboard, is put into the inside bottom of the exterior container 15. The four individual package blocks 22 are placed on the lower pad 16 via the divider 8 made of the A flute double faced corrugated cardboard, and another individual package blocks 22 are placed in fours thereon. The circumference of the eight individual package blocks 22 are enclosed by a sleeve 27 made of the double wall corrugated cardboard using the A flute and the B flute, four sheets of filling plates 11 are placed on each of the individual package blocks 22, the upper pad 17 made of the A flute double faced corrugated cardboard is placed thereon, and then the top panel of the exterior container 15 is closed. The gross weight of the pack in Example 4 is 25.0 kg in which the weight of the battery pack 20 is 23.2 kg.

Hereinafter, the constructions of comparative examples 1 and 2 are shown as the comparative objects for examining the suitability of the above Examples 1 to 4.

COMPARATIVE EXAMPLE 1

An exterior container is of the same dimension as that of the exterior container 10 shown in Example 1, and the material thereof is made of the double faced corrugated cardboard using the A flute. A surface liner of this double faced corrugated cardboard belongs to the A class regulated in JIS P3902, and has a basis weight of 200 g/m$^2$ and a bursting strength of 5.8 kgf/cm$^2$, and a bursting strength of the double faced corrugated cardboard is 11.0 kgf/cm$^2$ in a measuring method regulated in JIS.

The method for forming the exterior container and the method for packing the two individual package blocks 22, and number of the accessories used are also same. The gross weight of the pack in this comparative example 1 is 6.3 kg in which the gross weight of the battery pack 20 is 5.8 kg.

COMPARATIVE EXAMPLE 2

Only the filling plates are remained as the accessories from the construction according to the comparative example 1, and two individual package blocks 22 are contained to be packed directly in the exterior container. The gross weight of the pack in this comparative example 2 is 6.0 kg in which the gross weight of the battery pack 20 is 5.8 kg.

For the aforementioned Examples 1 to 4 and comparative examples 1 and 2, tests are conducted under same conditions. The test items are a pseudo-stacking test up to 3 meters or more, and a drop test. The following test methods are in use in public laboratories.

For the test conditions of the stacking test, objects had been left for 24 hr in an atmosphere of temperature of 20° C. and relative humidity of 65%, and then test was conducted under the condition according to a criterion of calculation represented by the following equation:

$$W=(3-h)/h \times G$$

where W is a test load, h is a height of the object, and G is a gross weight of the object.

The criterions of the stacking test are (1) that contents are never ejected, and (2) that there are no alteration that may affect on the safety of the transport and no transformation that may impair the safety of the stack.

For the test conditions of the drop test, the objects had been left in an atmosphere of temperature of 20° C. and relative humidity of 65%, and then test was conducted under following conditions.

The drop is repeated five times in such a falling posture that the center of gravity lies at an impact point in a perpendicular line to a falling face, except for face-to-face drop. The first drop is a diagonal drop falling from the corner of the top panel to the falling face, the second drop is the face-to-face drop from the bottom panel, the third drop is the face-to-face drop from the top panel, the fourth drop is the face-to-face drop from a side panel, and the fifth drop is the face-to-face drop from an end. A falling height (H) is given by the following equation:

$$H=1.2m\times(\text{mass defined by its specification})/(\text{actual mass})$$

The criterions of the drop test are (1) that contents are never ejected, and (2) that the exterior container has no damage that affects on the safety of the transport, and the contents never leaks from an interior container.

The aforementioned stacking and drop tests are conducted for each of Examples 1 to 4 and the comparative examples 1 and 2, and results of visual evaluation are shown in Table 2. Rough constructions of Examples 1 to 4 and the comparative examples 1 and 2 are shown in Table 1 to be provided for reference of comparison.

TABLE 1

| | Gross weight | Total Weight of Batteries | Exterior Container | Accessories |
| --- | --- | --- | --- | --- |
| Example 1 | 6.8 kg | 5.8 kg | Double Wall Corrugated Cardboard | With Accessories |
| Example 2 | 6.5 kg | 5.8 kg | Double Wall Corrugated Cardboard | Without Accessories |
| Example 3 | 13.1 kg | 11.6 kg | Double Wall Corrugated Cardboard | With Accessories |
| Example 4 | 25.0 kg | 23.2 kg | Doublw Wall Corrugated Cardboard | With Accessories |
| Comparative Example 1 | 6.3 kg | 5.8 kg | Double Faced Corrugated Cardboard | With Accessories |
| Comparative Example 2 | 6.0 kg | 5.8 kg | Double Faced Corrugated Cardboard | Without Accessories |

As can be seen in Table 2, any of the constructions shown in Examples 1, 2, 3, and 4 results in passing on each evaluation item of the stacking test and the drop test. On the other hand, the comparative examples 1 and 2 both fail in overall evaluation, however, in the construction of the comparative example 1, it can be seen that the accessories such as the sleeve and upper and lower pads using the double wall corrugated cardboard reinforce the exterior container using the double faced corrugated cardboard.

As can be seen in Table 1, difference between Examples and the comparative examples is considered that difference of the bursting strength due to the exterior containers 10, 13, 14, and 15 using the double wall corrugated cardboard is significant, and even if the content (individual package blocks 22) has a heavy weight or a large volume, accessories such as sleeves 18, 27 and lower pads 7, 16 reinforce the exterior containers 14, 15.

Although there has been shown in Examples described hereinbefore that the battery pack 20 constituted by integrally coupling a plurality of small batteries 1 is assumed as an object to be packed, a plurality of cells can also be packed. In this case, the cells are contained one by one within a lattice frame formed with insulating paper including kraft paper in order to prevent short circuit and protect the cells.

Moreover, although the exterior containers 10, 13, 14, and 15 are formed using the double wall corrugated cardboard with a combination of the A flute and the B flute, a combination of the C flute and the B flute, which is typically used in Europe and the United States of America, is also effective. In case the weight is heavy, or the volume is large, or higher strength is desired, the triple wall corrugated cardboard is effectively used. Also, the exterior container can be made of a fiberboard. On the contrary, when the weight is light, or the volume is small, a desired strength is obtained even from a double faced corrugated cardboard having a bursting strength of 13.0 kgf/cm$^2$ or more. These options are desired to be used properly depending on kinds of batteries or kinds of the devices or equipment using the batteries, however, higher strength necessarily increases price of the package container.

INDUSTRIAL APPLICABILITY

According to the package container of the present invention, a form of the package for transporting small batteries such as lithium batteries excluded from the designation of the dangerous goods, the batteries for which a standard of the package for transport is not fixed, is constructed as those according to the package form of the batteries diagnosed as the dangerous goods, for which the standard of the package has been established, therefore this package container is useful for establishing the safe transport of the small batteries.

TABLE 2

| | Criterion | Example 1 | Example 2 | Example 3 | Example 4 | Comparative Example 1 | Comparative Example 2 |
| --- | --- | --- | --- | --- | --- | --- | --- |
| Stacking Test | (1) | Pass | Pass | Pass | Pass | Pass | Pass |
| | (2) | Pass | Pass | Pass | Pass | Pass | Fail |
| Drop Test | (1) | Pass | Pass | Pass | Pass | Pass | Fail |
| | (2) | Pass | Pass | Pass | Pass | Fail | Fail |
| Overall Evaluation | | Pass | Pass | Pass | Pass | Fail | Fail |

The invention claimed is:

1. A package container for transporting small batteries having a lithium content equal to or less than a regulated value diagnosed as dangerous goods, comprising:
    a plurality of package packs, each of the package packs including a plurality of small batteries;
    an envelope formed of a first material, said plurality of batteries being surrounded by and arranged in said envelope; and
    a package pad, said pad being formed of a second material, said first material being different from and more flexible than said second material, said pad being arranged around the envelope and the batteries, the package pad being secured around the envelope to thereby provide a secure enclosure of the batteries,
    an exterior container containing a plurality of the package packs, the container having a gross weight of 25 kg or less, and
    a material forming the exterior container having a strength of 13.0 $kgf/cm^2$ or higher in a bursting strength test method regulated in JIS.

2. A package container for transporting small batteries having a lithium content equal to or less than a regulated value diagnosed as dangerous goods, comprising:
    a plurality of package packs, each of the package packs including a plurality of small batteries;
    an envelope formed of a first material, said the batteries being surrounded by and arranged in said envelope; and
    a package pad, said pad being formed of a second material, said first material being different from and more flexible than said second material, said pad being arranged around the envelope and the batteries, the package pad being secured around the envelope to thereby provide a secure enclosure of the batteries, and
    an exterior container for packing a plurality of the package packs, the container having a gross weight of 25 kg or less,
    the exterior container being formed in a hexahedron, with each corner in each face lying at right angle, and
    the exterior container having a strength such that the small batteries are never ejected even when the exterior container drops on the corner of its top panel diagonally from a height of 1.2 m, and a transformation that affects on safety of transport is never occurred even when the exterior containers are stacked up to a height of 3 m.

3. The package container according to any one of claims 1 and 2, wherein a material for forming the exterior container is a double wall corrugated cardboard or a triple wall corrugated cardboard, each cardboard having a thickness of 7 mm or more, and comprising a pulp liner.

4. The package container according to claim 3, wherein the material for forming the exterior container is the double wall corrugated cardboard and a surface liner of the double wall corrugated cardboard has a basis weight of 210 $g/m^2$ or more in accordance with JIS regulation, and a bursting strength of 6 $kgf/cm^2$ or more in accordance with JIS regulation.

5. The package container according to any one of claims 1 and 2, wherein a material for forming the exterior container is a double wall corrugated cardboard or a triple wall corrugated cardboard with an optional combination of A flute, B flute, and C flute.

6. The package container according to claim 5, wherein the material for forming the exterior container is the double wall corrugated cardboard and a surface liner of the double wall corrugated cardboard has a basis weight of 210 $g/m^2$ or more in accordance with JIS regulation, and a bursting strength of 6 $kgf/cm^2$ or more in accordance with JIS regulation.

7. The package container according to any one of claims 1 and 2, wherein at least one layer of a double wall corrugated cardboard or a double faced corrugated cardboard is placed inside of the exterior container.

8. The package container according to any one of claims 1 and 2, wherein the small batteries are lithium primary batteries or lithium ion rechargeable batteries.

9. The package container according to any one of claims 1 and 2, wherein the small batteries are devices incorporating lithium primary batteries or lithium ion rechargeable batteries, or equipment packed together with the lithium primary batteries or the lithium ion rechargeable batteries.

10. The package container according to any one of claims 1 and 2, wherein the small batteries are partitioned by each cell with an insulating material.

11. The package container according to any one of claims 1 and 2, wherein each of the package packs further includes a safety unit (SU) substrate arranged in connection with the batteries, the package pad being wrapped around the envelope and the batteries without covering the SU substrate so that the SU is visible through the package pack, the package pad being secured by tape to itself to thereby secure the batteries in an enclosure defined by the package pad.

12. The package container according to any one of claims 1 and 2, wherein the small batteries are lithium primary batteries in which metal lithium or lithium alloy is 1 g or lower in a cell or 2 g or lower in a battery pack, or lithium ion rechargeable batteries in which a converted metal lithium content is 1.5 g or lower in a cell or 8 g or lower in a battery pack.

* * * * *